2,024,715

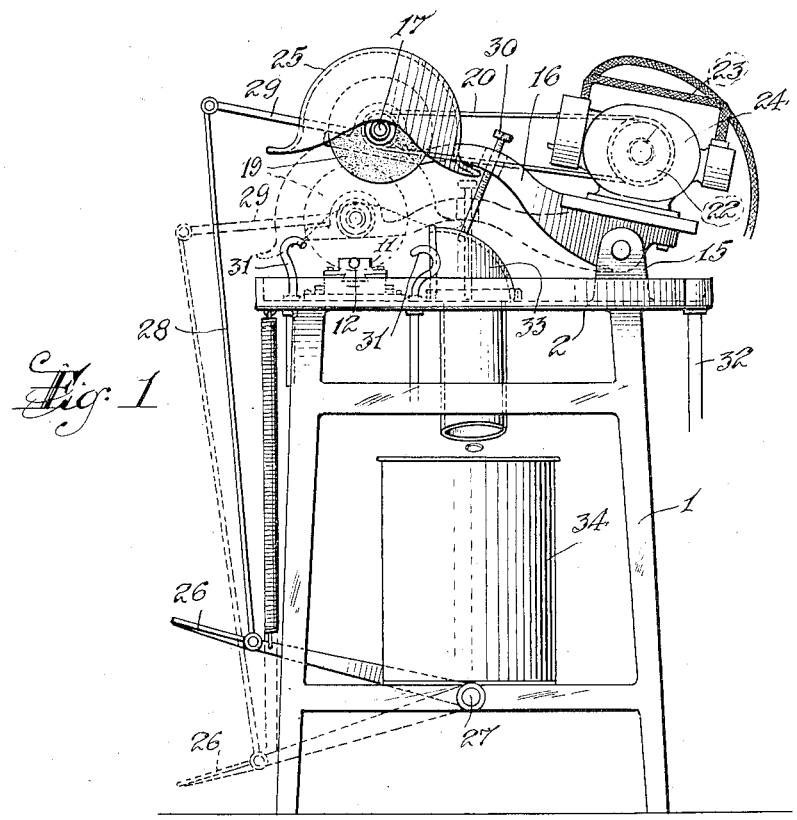
Fig. 1
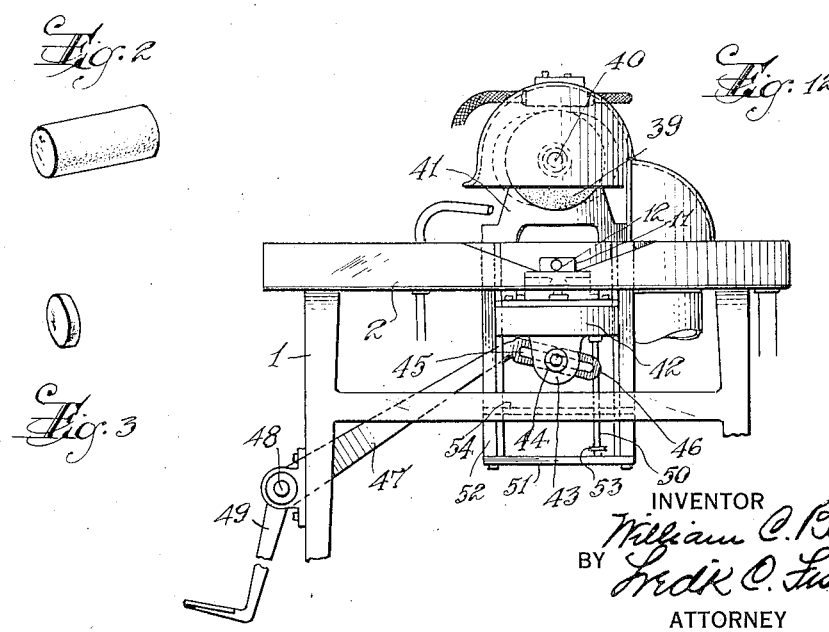
Fig. 2
Fig. 3
Fig. 12
INVENTOR
William C. Bennett
BY Fredk C. Fischer
ATTORNEY Dec. 17, 1935.   W. C. BENNETT   2,024,715
APPARATUS FOR MAKING BUTTON BLANKS FROM PEARL STOCK
Filed Nov. 21, 1934   2 Sheets-Sheet 2
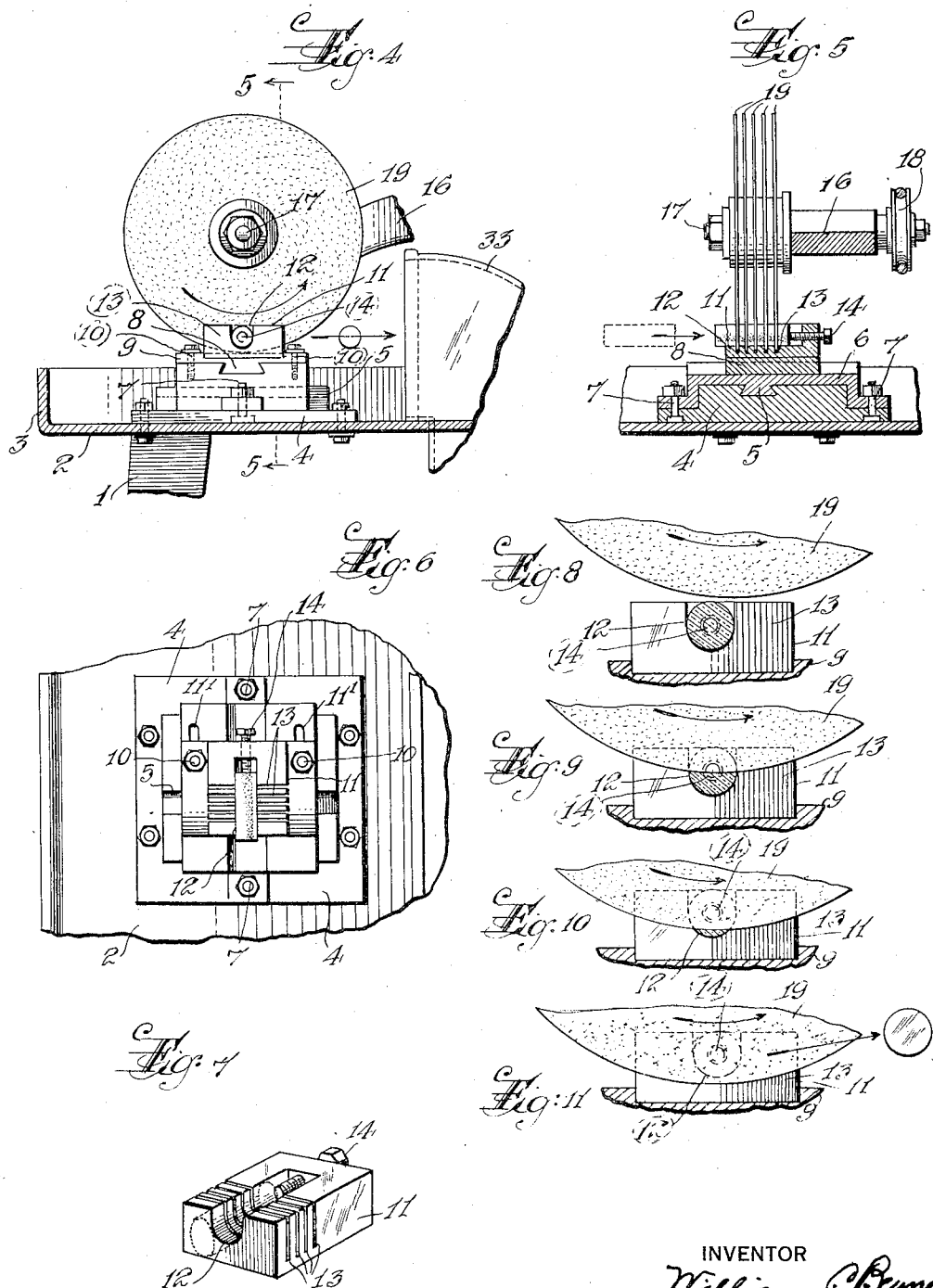
INVENTOR
William C. Bennett
BY
Fredk C. Fischer
ATTORNEY Patented Dec. 17, 1935

UNITED STATES PATENT OFFICE 2,024,715

APPARATUS FOR MAKING BUTTON BLANKS FROM PEARL STOCK

William C. Bennett, New York, N. Y.

Application November 21, 1934, Serial No. 754,022

2 Claims. (Cl. 79—15)

This invention relates to improvements in devices for cutting button blanks from pearl stock, and more particularly to improved means for holding pearl stock during the cutting operation.

Heretofore, in apparatus for cutting buttons from pearl stock, there has been provided gripping means for holding the pearl stock during the cutting operation, it being usually the custom to arrange said gripping means about the periphery of a drum, which is intermittently rotated to successively bring pieces of pearl stock into engagement with circular saws.

Such devices have been objectionable in that they are expensive, and it is inconvenient to place the pearl stock in the gripping means. Also, a circular saw has a tendency to rotate the stock, thus causing burrs and uneven surfaces.

It is an object of this invention to provide an apparatus for cutting buttons from pearl stock, having a support for the pearl stock during the cutting operation, which support has no means for gripping the pearl stock.

A further object is the provision of a block for holding pearl stock, which block is adjustable in two directions.

A further object is the provision of a block having means for limiting the longitudinal movement of the pearl stock therein, said means having point contact with an end of the stock so that regardless of the unevenness of the end of the pearl stock, it will be properly positioned in the block.

A further object is the provision of an apparatus for cutting buttons from pearl stock in which the buttons are automatically ejected as soon as they are cut.

These and other advantageous objects which will later appear are accomplished by the simple and practical construction and arrangement of parts, hereinafter described and exhibited in the accompanying drawings, forming part hereof, and in which:

Fig. 1 is a side elevational view of my apparatus for cutting buttons from pearl stock, Fig. 2 is a perspective view of a piece of pearl stock, Fig. 3 is a perspective view of a button blank cut from pearl stock, Fig. 4 is an elevational view partly in section showing details of the apparatus during the cutting operation.

Fig. 5 is a sectional view taken on line 5—5 of Fig. 4.

Fig. 6 is a plan view showing details of the adjustable block,

Fig. 7 is a perspective of a block for pearl stock during the cutting operation, Figs. 8, 9, 10 and 11 are views showing steps in the process of cutting a button from pearl stock, and Fig. 12 is an elevational view of a modified form of the invention.

Referring to the drawings, in Fig. 1 there is shown a supporting frame 1 having a table 2 provided with a peripheral flange 3, see Fig. 4. Mounted on the table is a plate 4 having a dove-tail groove receiving the dove-tail 5 of a plate 6, the latter being secured to the plate 5 by means of bolts 7. The plate 6 is provided with a dove-tail groove receiving the dove-tail 8 of a plate 9, which is adjustably secured to the plate 6 by means of bolts 10 entering slots 11' in the plate 6, see Figs. 4, 5, 6. The upper side of the plate 9 is provided with a groove in which is slidably positioned a block 11 for pearl stock. The block 11, see Fig. 7, comprises substantially a metal block having a longitudinal semi-cylindrical groove 12 and a plurality of spaced transverse slots 13, which slots extend slightly below the bottom of the groove 12 so that when a button blank is cut from pearl stock the cutter will not strike the metal block 11. At one end of the block 11 there is provided a screw 14 which projects into the groove for the purpose of longitudinally positioning a piece of pearl stock in the groove 12.

Pearl stock generally has uneven ends, although the main body of the stock may be cylindrical. Consequently, by providing a set screw 14 of considerably less diameter than the pearl stock a substantial point contact with the end of the pearl stock is obtained, which longitudinally positions the pearl stock without the tendency to wobble.

Projecting upwardly from the table 2 are ears 15 on which is pivoted an arm 16 having at one end thereof a shaft 17 to which is attached a pulley 18, and a plurality of cutters 19, the latter being made very thin from a suitable abrasive material.

Passing over the pulley 18 is a belt 20 which passes over pulley 22 attached to the shaft 23 of an electric motor 24 mounted on the upper side of the arm 16 adjacent the ears 15. Supported by the arm 16 and covering the cutters 19 is a guard 25 to prevent scattering of pieces of pearl stock and dust during the cutting operation.

In operation, the cutters are brought downwardly into engagement with a piece of pearl stock resting on the block 11, by applying pressure to a foot pedal 26 pivoted at 27 to a frame 1.

The pedal 26 is connected to a link 28 which in turn is connected to another link 29, the latter being attached to the arm 16. The downward movement of the arm 16 is limited by means of a stop 30 comprising a threaded bolt passing through the arm 16 and engaging the table 2 when the cutters have been moved to the predetermined lowermost position.

Before the cutters engage the pearl stock they are caused to rotate at very high speed; and when the cutters engage the stock, the pressure of the cutters thereon holds the stock in position without rotation of any kind. During the cutting operation, considerable heat is generated and it is necessary to cool the cutters and the stock; and for this purpose I provide tubes 31 passing upwardly through the table. These tubes are positioned adjacent the pearl stock and cutters; and have curved ends to direct water passing through the tubes onto the stock and cutters. The water falls upon the table 2 and is drained therefrom by means of a pipe 32.

When the cutting operation has been completed and the buttons severed from the pearl stock, the cutters automatically lift the buttons and eject them with great velocity from the block 11. Adjacent the block 11 there is provided a funnel 33 which receives the ejected buttons and directs them downwardly into a receptacle 34.

From the above description it is seen that I have provided a simple and relatively inexpensive machine for cutting buttons from pearl stock. With my machine, it is not necessary to grip the pearl stock during the cutting operation, as the pressure of the cutters on the stock is sufficient to hold the stock in position and prevent rotation thereof. Also, after the cutting operation the buttons are automatically ejected. This is of considerable advantage in view of the fact that in machines heretofore provided for cutting buttons in pearl stock, it has been necessary to manually remove the cut buttons from the gripping devices after the cutting operations.

In Fig. 12 is shown a modified form of my invention in which the cutters 39 are mounted upon a shaft 40 of an electric motor supported by the frame 41, the latter being mounted upon the table 2. In accordance with this form of the device, the pearl stock is moved upwardly into engagement with the rotating cutter. To accomplish this, the block 11 and its associated adjustable plates 9, 6 and 4 are mounted upon a block 42 having depending ears 43 provided with a pin 44 moving in a slot 45 in the downturned end 46 of the lever arm 47, the lever being pivoted at 48 to the frame 1 and having a downwardly extending arm 49 adapted to be engaged by a foot.

In operation, the downward pressure upon the arm 49 rotates the lever and causes the arm 47 to move upwardly to carry the block 42 and pearl stock upwardly therewith into engagement with the cutters 39. The downward movement of the block 42 is limited by a rod 50 which engages a bar 51 on a small frame 52 depending from the lower side of the table 2. The upward movement of the block 42 is limited by a flange 53 on the rod 50 which engages a bar 54 on the frame 52.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention what I claim as new and desire to secure by Letters Patent, is:

1. In an apparatus for cutting button blanks from pearl stock, a base, a block mounted on the base and having a horizontal longitudinal groove and a plurality of transverse slots, said slots extending below the bottom of the groove, a pivotally mounted arm, a plurality of spaced thin parallel cutters of abrasive material mounted at one extremity of the arm and arranged to enter the slots in the block, means to rotate said cutters at high speed, means to move the arm to cause the cutters to press downwardly on the stock by force of gravity, and means to limit the downward movement of said arm, said button blanks after being completely cut from the stock being ejected from the block at high velocity by frictional engagement with the cutters rotating at high speed, and a funnel member to receive the ejected button blanks and direct them into a receptacle.

2. In an apparatus for cutting button blanks from pearl stock, a block having a horizontal longitudinal groove and a plurality of transverse slots extending below the bottom of the groove, a plurality of spaced thin parallel cutters of abrasive material arranged to enter the slots in the block, supporting means to cause the cutters to press downwardly on the stock by force of gravity, means to rotate the cutters at high speed, said button blanks after being completely cut from the stock being ejected from the block at high velocity by frictional contact with the cutters rotating at high speed, and means in the path of the ejected button blanks to direct them into a receptacle.

WILLIAM C. BENNETT.